(12) United States Patent
Hansen

(10) Patent No.: US 9,579,699 B2
(45) Date of Patent: Feb. 28, 2017

(54) BULK MATERIAL COVER COMPOSITIONS AND METHODS OF APPLYING

(75) Inventor: David L. Hansen, Ivins, UT (US)

(73) Assignee: LSC ENVIRONMENTAL PRODUCTS, LLC, Apalachin, NY (US)

( * ) Notice: Subject to any disclaimer, the term of this patent is extended or adjusted under 35 U.S.C. 154(b) by 433 days.

(21) Appl. No.: 14/115,169

(22) PCT Filed: May 4, 2012

(86) PCT No.: PCT/US2012/036578
§ 371 (c)(1),
(2), (4) Date: Feb. 13, 2014

(87) PCT Pub. No.: WO2012/151519
PCT Pub. Date: Nov. 8, 2012

(65) Prior Publication Data
US 2014/0154418 A1    Jun. 5, 2014

Related U.S. Application Data

(60) Provisional application No. 61/482,488, filed on May 4, 2011.

(51) Int. Cl.
| | | |
|---|---|---|
| *B09B 1/00* | (2006.01) |
| *C08L 1/32* | (2006.01) |
| *C08L 1/08* | (2006.01) |
| *C08L 1/28* | (2006.01) |
| *B05D 7/24* | (2006.01) |
| *C04B 28/02* | (2006.01) |
| *B09B 3/00* | (2006.01) |
| *C04B 16/02* | (2006.01) |
| *C04B 16/06* | (2006.01) |
| *C04B 28/04* | (2006.01) |
| *C08K 7/02* | (2006.01) |
| *C04B 111/00* | (2006.01) |

(52) U.S. Cl.
CPC .............. *B09B 1/004* (2013.01); *B05D 7/24* (2013.01); *B09B 3/0033* (2013.01); *B09B 3/0041* (2013.01); *C04B 16/02* (2013.01); *C04B 16/0683* (2013.01); *C04B 28/02* (2013.01); *C04B 28/021* (2013.01); *C04B 28/04* (2013.01); *C08L 1/08* (2013.01); *C08L 1/284* (2013.01); *C08L 1/286* (2013.01); *C08L 1/32* (2013.01); *B05D 2401/20* (2013.01); *C04B 2111/00155* (2013.01); *C04B 2111/00775* (2013.01); *C08K 7/02* (2013.01); *Y02W 30/32* (2015.05); *Y02W 30/92* (2015.05)

(58) Field of Classification Search
CPC .............. C08L 1/00; C08L 1/08; C08L 1/26; C08L 1/28; C08L 1/284; C08L 1/286; C08L 1/288; C08L 1/32; B09B 1/004; B09B 3/0033; B09B 3/0041; Y02W 30/32; B05D 5/00; B05D 7/24; B05D 2203/00; B05D 2401/20
USPC ............ 427/136, 415, 339; 524/31, 35, 733; 525/54.21; 106/163.01, 162.71, 162.72, 106/168.01, 140.1, 162.8, 172.1, 139.1; 405/129.9, 129.3
See application file for complete search history.

(56) References Cited

U.S. PATENT DOCUMENTS

| | | | | |
|---|---|---|---|---|
| 2,883,327 | A * | 4/1959 | Dale ................ | A61K 47/183 106/181.1 |
| 5,576,286 | A * | 11/1996 | Karp ................ | A61L 9/048 512/2 |
| 6,435,770 | B1 * | 8/2002 | Shi ................... | B09B 1/004 241/23 |
| 6,806,298 | B1 | 10/2004 | Nachtman et al. | |
| 7,284,930 | B2 | 10/2007 | Shi et al. | |
| 8,710,131 | B2 * | 4/2014 | Bergman .......... | C08F 2/20 524/105 |
| 8,808,442 | B2 * | 8/2014 | Bernu ............... | C09K 17/50 106/124.4 |
| 2005/0154097 | A1 * | 7/2005 | Bonora ............. | C08K 5/34 524/90 |
| 2009/0275111 | A1 * | 11/2009 | Grossman ......... | C08J 5/18 435/262 |
| 2010/0294725 | A1 * | 11/2010 | Bush ................ | C02F 1/5272 210/702 |

(Continued)

FOREIGN PATENT DOCUMENTS

WO    9013598 A1    11/1990

OTHER PUBLICATIONS

40 CFR §§141.60-141.66 (Chapter 1, Subpart G), "National Primary Drinking Water Regulations: Maximum Contaminant Levels and Maximum Residual Disinfectant Levels," retrieved online from http://www.ecfr.gov, Oct. 6, 2016, 14 pages.*

(Continued)

*Primary Examiner* — William Phillip Fletcher, III
(74) *Attorney, Agent, or Firm* — Heslin Rothenberg Farley & Mesiti P.C.

(57) ABSTRACT

A cover material for a bulk material pile and method for applying the cover material are disclosed. The cover composition is free of fiber, clay, cement and pozzolanic material and comprises: 95 to 99.75 percent by weight water, 0.25 to 5 percent by weight of a water dispersible cellulosic polymer; and sufficient acid to maintain the pH of the solution between 1.0 and 6.0. The method for applying the cover material includes: providing the cover composition, which contains 95 to 99.75 percent by weight water, 0.25 to 5 percent by weight of a water dispersible cellulosic polymer; and sufficient acid to maintain the pH of the solution between 1.0 and 6.0; applying the cover composition onto a bulk material pile; and allowing the composition to harden to provide a cover to at least a portion of the bulk material pile.

20 Claims, No Drawings

(56) References Cited

U.S. PATENT DOCUMENTS

2011/0113983 A1\* 5/2011 Bernu .................... C09K 17/50
106/15.05

OTHER PUBLICATIONS

International Preliminary Report on Patentability for PCT/US2012/036578, Nov. 5, 2013, 5 pages.\*
International Search Report for PCT/US2012/036578 dated Dec. 3, 2012.

\* cited by examiner

BULK MATERIAL COVER COMPOSITIONS AND METHODS OF APPLYING

CROSS REFERENCE TO RELATED APPLICATIONS

This application is a national stage filing under section 371 of International Application No. PCT/US2012/036578, filed on May 4, 2012, and published in English on Nov. 8, 2012, as WO 2012/151519, and claims priority from U.S. provisional application 61/482,488, filed May 4, 2011. The entire disclosures of each of the prior applications are hereby incorporated herein by reference.

FIELD OF THE INVENTION

This invention relates to protective coverings for bulk material piles, for example, for waste piles. Particularly, the invention relates to sprayable cover materials for waste piles that provide a durable cover that reduces material movement.

BACKGROUND OF THE INVENTION

During the processing or storage of waste, for instance industrial waste such as soil and fly ash, the waste may be concentrated into piles. When waste is concentrated into piles, it is often necessary to cover the waste piles to minimize the emission of odor and prevent the movement of the waste, particularly when the waste is particulate.

Several spray-on coatings have been developed to provide an effective cover to waste piles. These include the coatings described in U.S. Pat. Nos. 5,161,915; 5,275,508; 5,385,429; 5,525,009; and 7,544,243 (the disclosures of which are incorporated by reference here in their entirety), which are marketed under the registered trademark POSI-SHELL by LSC Environmental Products, LLC of Apalachin, N.Y. These cover materials typically comprise a mixture of water, mineral binder (such as cement kiln dust, "CKD," or similar materials), and fibers (both cellulose and synthetic) that can be sprayed on to a waste pile and allowed to set to provide an effective cover. These mineral-based covers have proven to provide effective covers to landfills and other waste piles.

Other prior art cover materials, for example, those described in U.S. Pat. Nos. 5,082,500 and 5,516,830, are primarily fiber based. These fiber based cover materials also include clay and a polymer that aid in retaining the integrity of the fiber-based matrix. These prior art covers are predominantly fiber with minor amounts of clay binder. Since the fiber in the fiber-based covers tends to agglomerate or flocculate, it is inherently difficult to fluidize the fiber based slurry in order to pump and spay these fiber-containing products effectively. Accordingly, these fiber-based cover materials typically require inordinately large water content to prevent agglomeration of the fibers. However, the low solids content of such fiber-based cover materials provides a non-uniform cover that, when subjected to rain and wind, can lose its integrity.

Aspects of the present invention overcome these and other limitations of the prior art and provide an effective bulk material pile cover that can be easily applied and maintained without the limitations and disadvantages of prior art material cover materials. Aspects of the present invention provide improved adhesion and ease in application, in that the spray can be applied quickly and easily.

SUMMARY OF THE INVENTION

The present invention provides an improved cover material and method for applying the cover material to a pile. In one aspect, the invention relates to a method of providing a cover to a bulk material pile. The method comprises: (a) providing a cover composition free of fiber, clay, cement and pozzolanic material, said composition comprising: 95 to 99.75 percent by weight water, 0.25 to 5 percent by weight of a water dispersible cellulosic polymer; and sufficient acid to maintain the pH of the solution between 1.0 and 6.0; (b) applying the cover composition onto the bulk material pile; and (c) allowing the composition to harden to provide a cover to at least a portion of the bulk material pile.

In another aspect the invention relates to a mixture for covering waste piles, said mixture being free of fiber, clay, cement and pozzolanic material, and said mixture comprising: 95 to 99.75 percent by weight water; 0.25 to 5 percent by weight of a water dispersible cellulosic polymer; and sufficient acid to maintain the pH of the solution between 1.0 and 6.0.

In another aspect, the invention relates to a bulk material cover composition consisting essentially of: (a) 95 to 99.75 percent by weight water that does not meet US EPA standards for potable water; (b) 0.25 to 5 percent by weight of a water dispersible cellulosic polymer; and (c) sufficient acid to maintain the pH of the solution between 1.0 and 6.0. Alternatively, the cover composition consists essentially of: (a) 95 to 99.75 percent by weight water that does not meet US EPA standards for potable water; (b) 0.25 to 5 percent by weight of a water dispersible cellulosic polymer; (c) sufficient acid to maintain the pH of the solution between 1.0 and 6.0; and (d) a coloring agent.

DETAILED DESCRIPTION OF THE INVENTION

The invention provides compositions and methods for covers for bulk material, such as soil and fly ash. The compositions comprise three elements: water, water dispersible cellulosic polymer and acid. The compositions may optionally contain colorant, but are free of fibers, clay and cementitious or pozzolanic materials, particularly as those terms are used in U.S. Pat. Nos. 5,399,048; 5,849,364; 6,096,373; 7,284,930 and 8,029,616. The terminology "free of" fiber, clay, cement and pozzolanic material as used herein means that only adventitious amounts of the named substances are found in the mixture. Generally these will be less than 5% by weight in total, usually less than 2%, and often less than 1%.

As discussed above, the cover material may also include a coloring agent. A coloring agent may be added to the compositions listed in Table 1 to provide the desired opacity or to provide an aesthetically pleasing shade of color to the composition. In one aspect, the coloring agent may comprise any conventional coloring agent, for example, a mortar dye, for instance, TRUE-TONE® mortar dye provided by Davis Color Corporation, may be added if desired, though other coloring agents may be used. In one aspect, from about 0.01 weight percent to about 1.0 weight percent coloring agent may be added to the composition, for example, from about 0.02 to about 0.5 weight percent coloring agent may be added.

In the methods and compositions described herein, the acid may be any acid. Examples include: hydrochloric, hydrobromic, sulphuric, nitric, citric, tartaric, phosphoric, lactic, pyruvic, acetic, succinic, oxalic, fumaric, maleic, oxaloacetic, methanesulphonic, ethanesulphonic, p-toluenesulphonic and benzenesulphonic. In certain embodiments, the acid comprises at least one of citric acid and acetic acid.

The acid is generally present in an amount sufficient to lower the pH of the solution to 6.0 or below. In some embodiments, the acid is sufficient to maintain a pH between 3.0 and 4.0. A preferred pH is about 3.5. To achieve these pH's, the acid often comprises 0.01 to 0.1 weight percent, and in some embodiments, 0.02 to 0.06 weight percent.

The polymer should be a water dispersible cellulose-derived polymer. All water-dispersible cellulosic polymers are envisioned, but those that are cold-water dispersible (i.e. under 40° C.) are preferred. Ideally, the polymer can be dispersed by means of a paddle mixer, although under certain circumstances an eductor may be employed. Suitable polymers include methylcellulose, ethyl methyl cellulose, hydroxyethyl cellulose (HEC), hydroxypropyl cellulose, hydroxyethyl methyl cellulose, hydroxypropyl methyl cellulose (HPMC), ethyl hydroxyethyl cellulose and carboxymethyl cellulose. In some embodiments the polymer is chosen from hydroxypropyl methyl cellulose (HPMC), hydroxyethylcellulose (HEC) and mixtures thereof. The polymer may comprise about 0.1 weight percent to about 5 weight percent of the cover material, for example, prior to or during application. In one aspect, the polymer may be about 0.25 weight percent to about 5 weight percent, or about 0.5 weight percent to about 2 weight percent of the material. In some embodiments, the polymer comprises 0.25 to 5.0 weight percent of the total solution; in some embodiments, the polymer comprises 1.0 to 2.0 weight percent of the total solution.

The composition, when sprayed on a particulate surface, enters the interstitial spaces and subsequently hardens or sufficiently increases in viscosity to form a film with the particles on the surface. It may be applied in any thickness desired, as long as the thickness is sufficient to congeal the surface of the substrate. It has been found that a thickness of under 1 mm provides adequate coverage without wasting material.

Details of these aspects of the invention, as well as further aspects of the invention, will become more readily apparent upon review of the following detailed description and the accompanying claims.

The cover composition for waste piles and methods in accordance with aspects of the present invention may be used to cover a variety of waste piles, for example, sludge heaps and soil piles. Aspects of the invention may also be used to cover non-waste-type material, for example, stockpiles of sand, mulch, topsoil, cement, contaminated soil, mine tailings, ash, fly ash, coal, cement clinker, or chemical or mechanical process intermediates, and the like, to protect the contents of the pile from, for example, precipitation or wind, among other things. However, in order to facilitate the description of aspects of the present invention, the following discussion will primarily refer to the present invention as it is applied to cover particulate waste piles. It will be apparent to those of skill in the art, that the cover composition and application process described may also be applied for other uses, for example, non-waste uses.

The composition of one aspect of the invention is listed in Table 1.

TABLE 1

Typical Content of Cover Composition Prior to Application According to One Aspect of the Invention

| Constituent | Quantity (weight percent) |
| --- | --- |
| water | at least 95 |
| Polymer | 0.25 to 5 |
| Acid | 0.01 to 0.1 |
| Coloring agent | 0 to 1.0 |

According to aspects of the invention, the liquid may be water, landfill leachate, industrial wastewater, or combinations thereof, or any other source of water that is readily available. For example, when the present invention is used to cover soil or fly ash, untreated pond water may be used as the source of the liquid. Water that contains amounts of contaminants that would make it unsuitable as drinking water according to the US EPA National Primary Drinking Water Regulations as set forth in 2010 CFR, Title 40, Chapter 1, Part 141, is adequate for preparing the solutions described herein. For example, potable water must be below 1 fecal coliform per 100 mL, whereas water that contains 1 fecal coliform per liter is perfectly adequate for preparing the solutions described herein. Similarly, potable water must be below 2 ppm mercury and 10 ppm nitrate, whereas such water is adequate for preparing the solutions described herein.

Though a weight percent of at least 95% (that is, prior to or during application to the pile) may be used as shown in Table 1, in some aspects, the weight percent of liquid may be at least about 97%, or at least about 98%, or at least about 99%, or at least about 99.75%.

Another embodiment comprises a composition comprising at least some polymer and at least some acid, for example, comprising little or no fiber, cement and/or pozzolanic material. According to this aspect of the invention, the polymer-acid composition may be provided to which the desired liquid, colorant, etc. may be introduced to provide the desired cover composition. The polymer-acid-water composition may coagulate and/or harden in situ. According to aspects of the invention, the coagulating and/or hardening of the polymer-acid-water composition can provide an effective cover to any one of the material piles disclosed herein, for example, a polymer cover to the pile, For example, in one aspect, the polymer-acid-water composition may be contacted with, for example, sprayed on, a soil and/or ash pile having a pH that promotes the coagulation of the polymer-acid composition, for instance, counteracting the coagulation minimizing or preventing effect of the acid in the polymer-acid composition. In another aspect, the coagulation of the polymer-acid composition may be promoted by the post application of water to the polymer-acid coated pile, for example, by rain.

According to one aspect, the composition of the polymer-acid (without liquid) may include about 95 weight percent to about 99.5 weight percent polymer, for example, about 97 weight percent to about 99 weight percent polymer, for example, cellulosic water dispersible polymer, such as, HPMC-treated water dispersible polymer and/or HEC-treated water dispersible polymer; and about 0.5 weight percent to about 5 weight percent acid, for example, about 1 weight percent to about 3 weight percent acid, for example, crystalline citric acid or its equivalent. In one aspect, this polymer-acid-water composition may be provided as a dry composition of polymer and acid, for example, to which water can be introduced to provide a cover composition. An embodiment of the dry composition is marketed under the name POSI-SHELL CLEAR™ by LSC Environmental Products.

According to aspects of the invention, the constituents listed above, for example, in Table 1, may be mixed in any convenient fashion and applied to the material pile. For example, the method may include providing a cover composition recited above; applying the composition onto the bulk material pile; and allowing the composition to harden to provide a cover to at least a portion of the bulk material pile.

In another aspect, a method of providing a cover to a bulk material is provided. The method includes or comprises introducing water into a container, for example, a tank; introducing acid and polymer to the mixture; agitating the mixture; and applying, for example, spraying, the mixture onto the bulk material pile. Alternatively, a method includes introducing water and acid into a container; introducing polymer to the mixture; agitating the mixture; and applying the mixture onto the bulk material pile. In one aspect, when the mixture is applied, the mixture produces a thin film on the bulk material pile, the film having a thickness less than 1 mm.

Once mixed, the composition may continue to be agitated, for example, slowly agitated by means of a commercial mixing device, such as a LSC Environmental Products PSA 2000 Applicator mixer, or its equivalent. If the composition requires transport to the point of application, the mixture may be agitated during transport.

Though the size of the pile to which the composition is applied may vary broadly, applied according to aspects of the invention, waste piles may be relatively large. Therefore, it may be necessary to cover a large area of the surface of these piles using the cover material in accordance with the present invention. According to one aspect, the cover may be distributed by an apparatus that is capable of applying the cover composition to a large area, for example, spraying on a large area, though smaller areas may also be covered with the material. For example, the area that is typically covered with the composition according to aspects of the invention may vary from 100 square feet to 100 acres, more typically between about 5000 square feet and 35 acres.

A distribution system may be provided which is capable of mixing and applying large volumes of the composition. A typical application apparatus may include a mixing tank having an agitator into which the ingredients (that is, the constituents) of the material cover can be introduced and mixed; a pump; and a conduit or hose with a nozzle to distribute the pumped slurry. The capacity of the mixing tanks may range from about 500 gallons to about 5,000 gallons. Typically, the agitator and pump may be powered by a diesel or gasoline engine. The entire application apparatus may be mounted on a trailer that could be towed by a truck or other powered means. Alternatively, the application apparatus may be mounted on the bed of a truck or mounted on a track unit to be guided to different areas of, for example, a landfill. Although the cover material for waste piles may be effectively mixed and applied using application equipment, it is possible to mix the ingredients and distribute the composition to form the cover material in other types of mixing equipment which have a sufficient mixing and spraying capacity.

The composition may be applied to the material pile by conventional means, for example, by spraying with a conventional spray applicator, such as, as Posi-shell® PSA 2000™ Applicator provided by LSC Environmental Products; a Bowie ADCM Applicator; or with common commercial hydro-seeding equipment, such as, the Bowie Lancer 600 Hydromulcher, or their equivalent. The composition or mixture may be applied onto the pile surface using a motion similar to spray painting. The improved adhesion qualities of the compositions described herein typically minimize or prevent undesirable exposure or inconsistencies in the cover.

During or after the entire surface area of the waste pile has been covered, the material may be allowed to harden. According to aspects of the invention, when the mixture is applied it will resemble a watery liquid, which will penetrate the surface of the waste pile and cohere to itself and to surface particles. Typically, the material will dry and harden within 24 hours. When a coloring agent is provided, such as mortar dye, the aesthetic appearance of the bulk material pile may also be enhanced. For example, aspects of the invention may provide a uniform color to mitigate an unsightly exposed waste pile.

After the waste pile has been sufficiently covered, the applicator and mixing unit may be cleaned out thoroughly when not in use so that the mixture remaining within the apparatus does not harden. Typically, water will suffice in cleaning the apparatus. For convenience, cleaning may occur directly on the treated area.

In addition, according to an aspect of the invention, areas of the cover which deteriorate, are disrupted, or exposed, for example, by the addition of further material to an existing pile, may be recovered by spraying additional composition on the deteriorated, exposed, or disrupted area.

While several aspects of the present invention have been described herein, alternative aspects may be conceived by those skilled in the art to accomplish the same or equivalent objectives. Accordingly, it is intended by the appended claims to cover all such alternative aspects as fall within the true spirit and scope of the invention.

The invention claimed is:

1. A method of providing a cover to a bulk material pile, the method comprising:
   a. providing a cover composition free of fiber, clay, cement and pozzolanic material, said composition comprising:
      95 to 99.75 percent by weight water;
      0.25 to 5 percent by weight of a water dispersible cellulosic polymer; and
      sufficient acid to maintain the pH of the solution between 1.0 and 6.0;
   b. applying the cover composition onto the bulk material pile; and
   c. allowing the composition to harden to provide a cover to at least a portion of the bulk material pile.

2. A method according to claim 1 wherein said cover composition consists essentially of:
   95 to 99.75 percent by weight water;
   0.25 to 5 percent by weight of a water dispersible cellulosic polymer; and
   sufficient acid to maintain the pH of the solution between 1.0 and 6.0.

3. A method according to claim 1 wherein said cover composition consists essentially of:
   95 to 99.75 percent by weight water;
   0.25 to 5 percent by weight of a water dispersible cellulosic polymer;
   sufficient acid to maintain the pH of the solution between 1.0 and 6.0; and
   a coloring agent.

4. The method according to claim 1, wherein the acid comprises at least one of citric acid and acetic acid.

5. The method according to claim 1, wherein the acid comprises 0.01 to 0.1 percent by weight of total composition.

6. The method according to claim 5, wherein the acid comprises 0.02 to 0.06 percent by weight of total composition.

7. The method according to claim 1, wherein the cellulosic water dispersible polymer comprises at least one of hydroxypropyl methyl cellulose (HPMC) and hydroxyethylcellulose (HEC).

8. The method according to claim 1, wherein the polymer comprises 1.0 to 2.0 weight percent of the total composition.

9. The method according to claim 1, wherein the acid comprises sufficient acid to maintain the pH at 3.0 to 4.0.

10. The method of claim 1, wherein said composition is applied to a thickness of less than 1 mm.

11. A mixture for covering waste piles, said mixture being free of fiber, clay, cement and pozzolanic material, said mixture comprising:
  95 to 99.75 percent by weight water;
  0.25 to 5 percent by weight of a water dispersible cellulosic polymer; and
  sufficient acid to maintain the pH of the solution between 1.0 and 6.0.

12. A mixture according to claim 11 consisting essentially of:
  95 to 99.75 percent by weight water;
  0.25 to 5 percent by weight of a water dispersible cellulosic polymer; and
  sufficient acid to maintain the pH of the solution between 1.0 and 6.0.

13. A mixture according to claim 11 consisting essentially of:
  95 to 99.75 percent by weight water;
  0.25 to 5 percent by weight of a water dispersible cellulosic polymer;
  sufficient acid to maintain the pH of the solution between 1.0 and 6.0; and
  a coloring agent.

14. The mixture according to claim 11, wherein the acid comprises at least one of citric acid and acetic acid.

15. The mixture according to claim 11, wherein the acid comprises 0.02 to 0.06 percent by weight of total composition.

16. The mixture according to claim 11, wherein the cellulosic water dispersible polymer comprises at least one of hydroxypropyl methyl cellulose (HPMC) and hydroxyethylcellulose (HEC).

17. The mixture according to claim 16, wherein the polymer comprises 1.0 to 2.0 weight percent of the total composition.

18. The mixture according to claim 11, wherein the acid comprises sufficient acid to maintain the pH at 3.0 to 4.0.

19. A bulk material cover composition consisting essentially of:
  95 to 99.75 percent by weight water that contains amounts of contaminants that would make it unsuitable as drinking water according to the US EPA National Primary Drinking Water Regulations as set forth in 2010 CFR, Title 40, Chapter 1, Part 141;
  0.25 to 5 percent by weight of a water dispersible cellulosic polymer; and
  sufficient acid to maintain the pH of the solution between 1.0 and 6.0.

20. A bulk material cover composition consisting essentially of:
  95 to 99.75 percent by weight water that contains amounts of contaminants that would make it unsuitable as drinking water according to the US EPA National Primary Drinking Water Regulations as set forth in 2010 CFR, Title 40, Chapter 1, Part 141;
  0.25 to 5 percent by weight of a water dispersible cellulosic polymer;
  sufficient acid to maintain the pH of the solution between 1.0 and 6.0; and
  a coloring agent.

* * * * *